Sept. 24, 1940. W. E. URSCHEL ET AL 2,215,535
METHOD AND APPARATUS FOR CUTTING WHOLE
STALKS OF CELERY INTO SHORT LENGHTHS
Filed Jan. 6, 1938 5 Sheets-Sheet 1

INVENTORS
William E. Urschel
Joe Richard Urschel
By Cox & Moore ATTORNEYS.

Sept. 24, 1940.  W. E. URSCHEL ET AL  2,215,535
METHOD AND APPARATUS FOR CUTTING WHOLE
STALKS OF CELERY INTO SHORT LENGHTHS
Filed Jan. 6, 1938  5 Sheets-Sheet 2
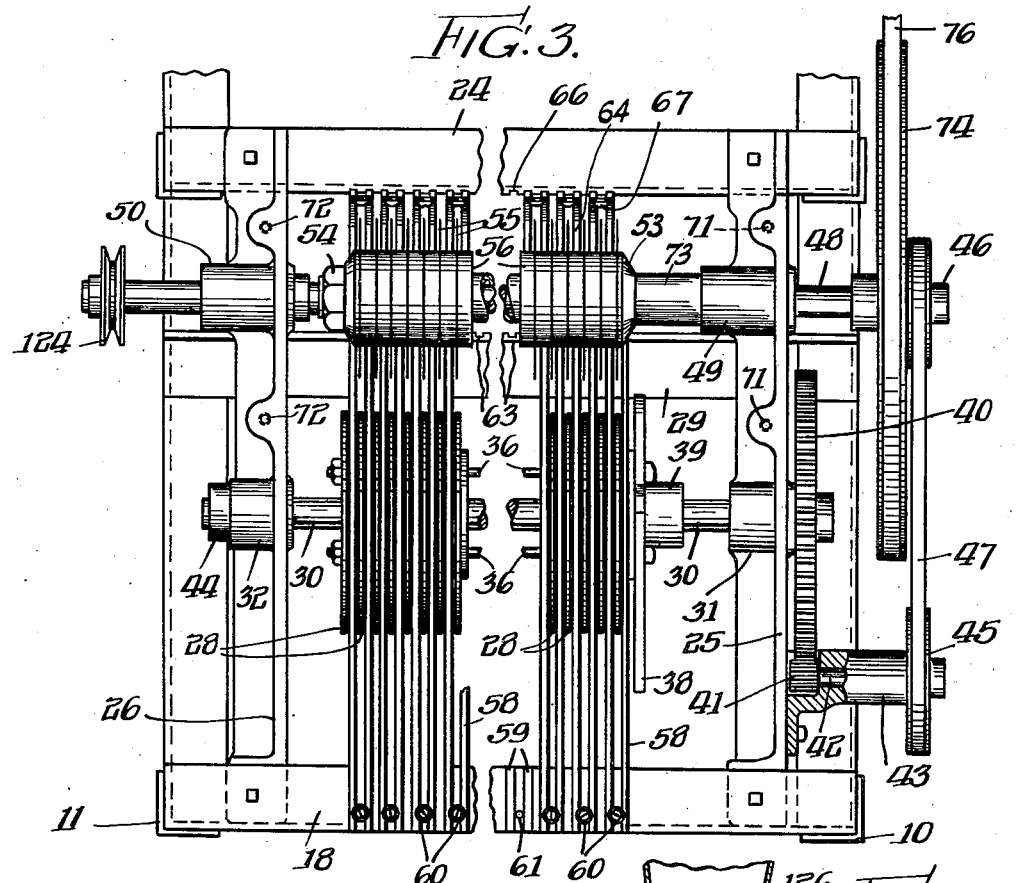
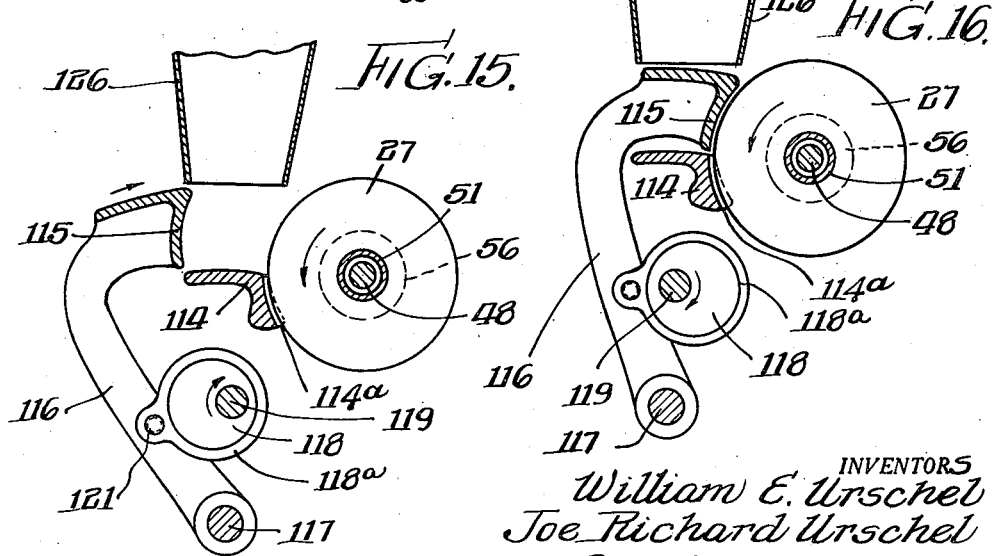
INVENTORS
William E. Urschel
Joe Richard Urschel
By: Cox & Moore ATTORNEYS.

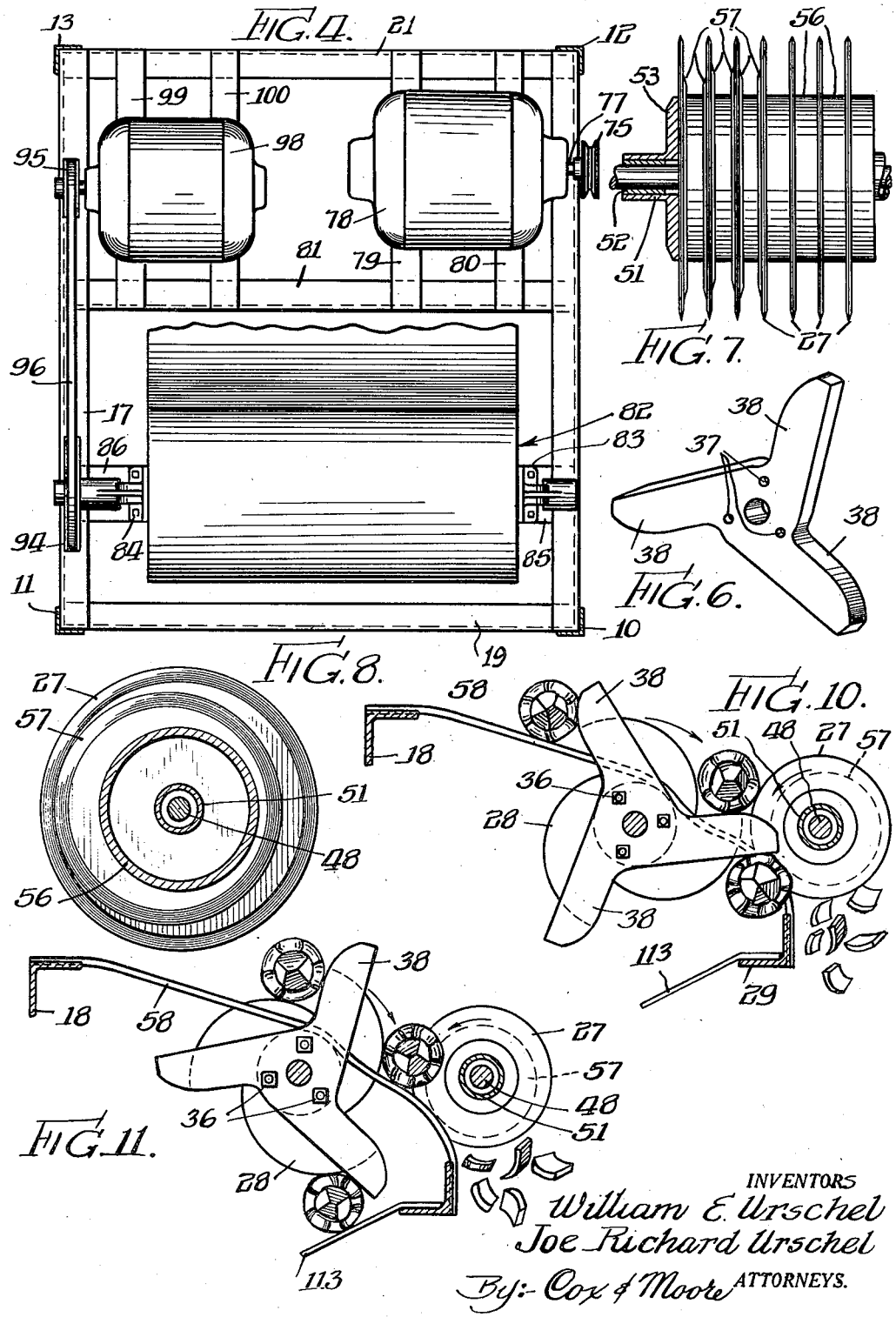

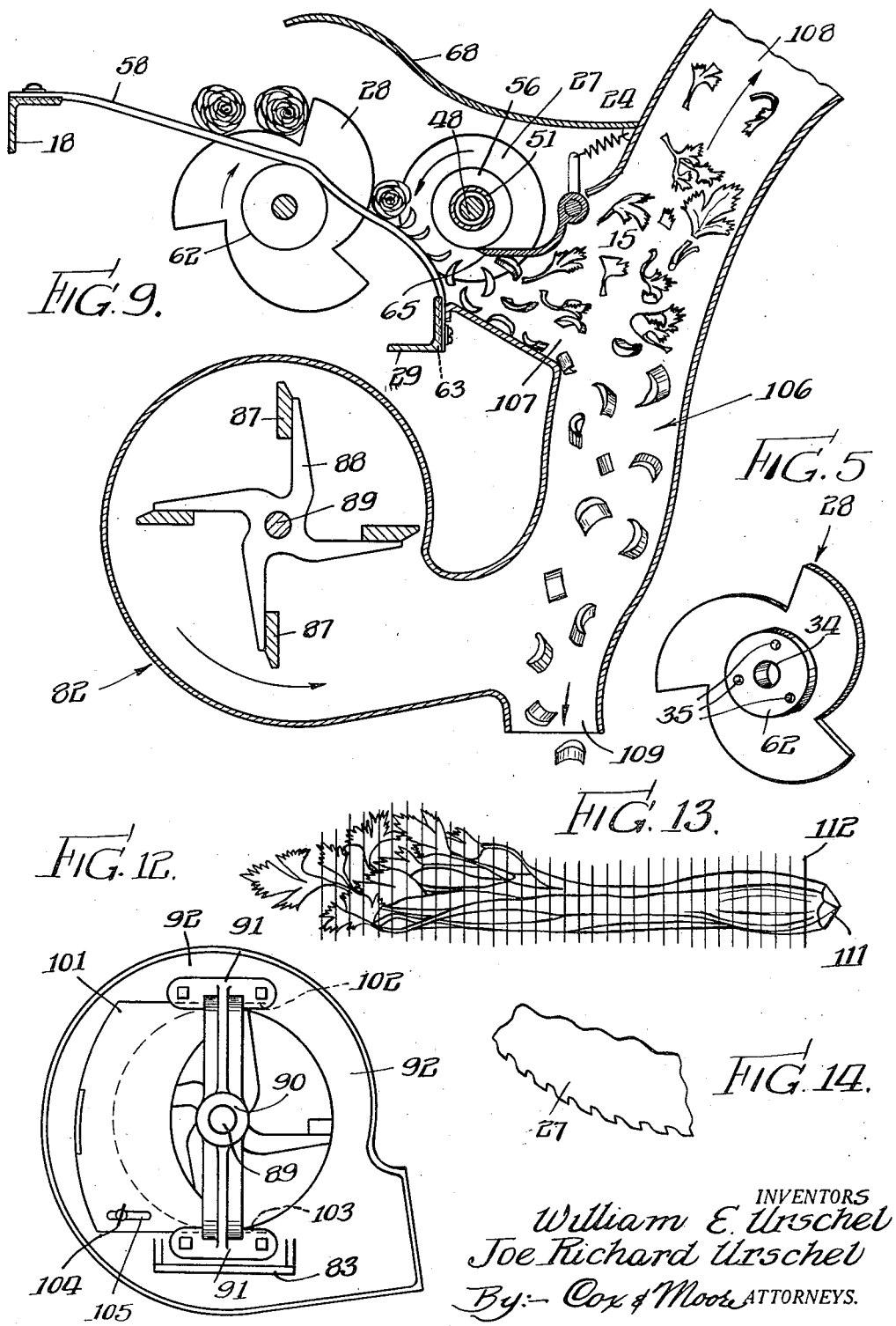

Sept. 24, 1940. W. E. URSCHEL ET AL 2,215,535
METHOD AND APPARATUS FOR CUTTING WHOLE
STALKS OF CELERY INTO SHORT LENGHTHS
Filed Jan. 6, 1938 5 Sheets-Sheet 5
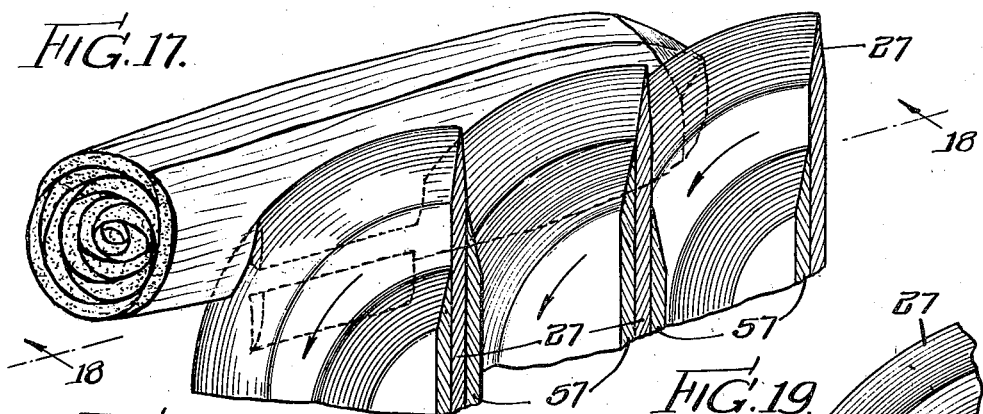
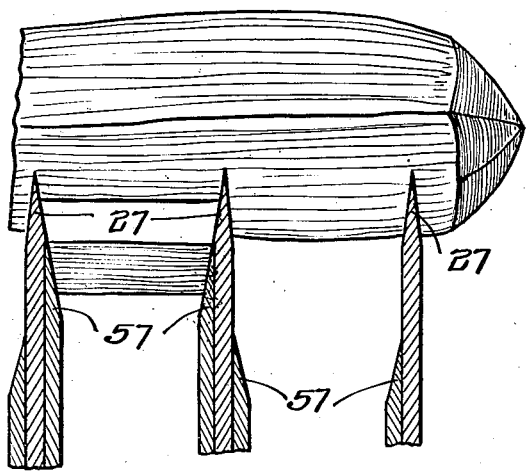
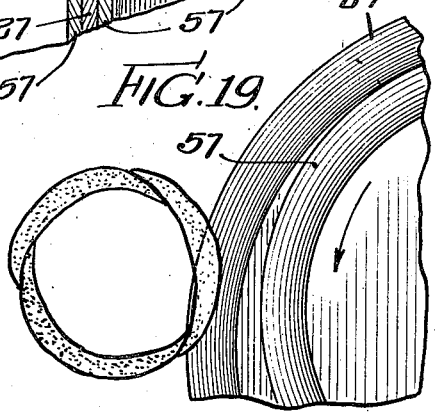
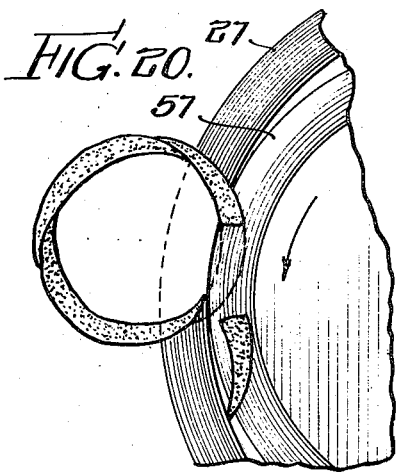
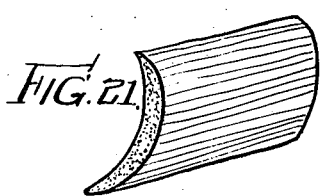
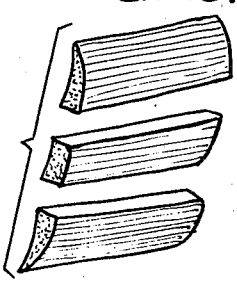
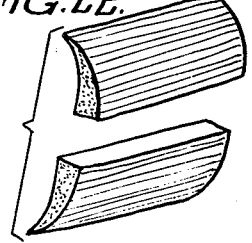
Inventors
William E. Urschel
Joe Richard Urschel
By:- Cox & Moore attys Patented Sept. 24, 1940

2,215,535

UNITED STATES PATENT OFFICE 2,215,535

METHOD AND APPARATUS FOR CUTTING WHOLE STALKS OF CELERY INTO SHORT LENGTHS

William E. Urschel and Joe Richard Urschel, Valparaiso, Ind.

Application January 6, 1938, Serial No. 183,698

11 Claims. (Cl. 146—98)

This invention relates to a method and apparatus for transversely dividing celery stalks into uniform lengths.

Among the objects of our invention is to provide a method and apparatus for cutting whole bunches of celery into a plurality of small pieces of substantially uniform length; to provide a new apparatus for feeding whole bunches of celery to a gang of cutting blades; to provide an improved method and apparatus for feeding whole bunches of celery into a machine transversely to be cut into a plurality of small pieces, including the simultaneous cutting and tearing of relatively longer pieces into smaller pieces and the separation of the pieces from the leaves and chaff; to provide a method and apparatus for tearing the wide celery pieces, transversely cut, into pieces of smaller cross section during the cutting operation; to provide improved means for cutting the leaves and for discharging the same without permitting the wadding together of the leaves; to provide means for discharging the butt end of the celery stalk and to provide means for insuring a constant delivery of air for separating the pieces of celery from the leaves irrespective of the speed of operation of the cutting means; to provide these and other objects of invention as will be apparent from a perusal of the following specification when taken in connection with the accompanying drawings, wherein:

Fig. 3 is a plan view of the machine with certain parts in section and some parts removed for clarity and observation;

Fig. 4 is a plan view of the fan and motors, the feed mechanism and knives being removed;

Fig. 5 is a perspective detail of one of the feed cams;

Fig. 6 is a perspective detail of the butt remover;

Fig. 7 is a partial view of the butt end cutting knives with the spindle in partial section;

Fig. 8 is a side elevation of the means for tearing the cut pieces of the celery, shown in combination with the cutting knives;

Fig. 9 is a diagrammatic view taken longitudinally at approximately the center of the machine, illustrating the position of the principal parts of the machine and their function in cutting and separating;

Fig. 10 is a diagrammatic view illustrating the position of the butt remover while the butt of a stalk is being cut;

Fig. 11 is a diagrammatic view similar to Fig. 10 except that it illustrates the position of the butt remover after the butt of the stalk has been cut and forced rearwardly by said butt remover;

Fig. 12 is a side elevation of the fan housing;

Fig. 13 is a diagrammatic view indicating the manner in which the bunch of celery is cut transversely;

Fig. 14 is a partial view illustrating the serrations upon the cutting edge of one of the knives;

Fig. 15 is a sectional view of an alternative form of reciprocating feed for the machine with the feed pusher back ready to receive the celery from the feed hopper positioned above it;

Fig. 16 is a sectional view similar to Fig. 15 but with the feed pusher completing its cycle positioned next to the cutting blades and the lower extremity of the feed chute closed;

Fig. 17 is a fragmentary, perspective view illustrating the action of the cutting and pulling mechanism on the celery stalk;

Fig. 18 is a sectional view taken on line 18—18 of Fig. 17;

Figs. 19 and 20 are views showing two successive steps in the cutting and pulling of the celery;

Figs. 21, 22 and 23 show the different sections or pieces of celery obtained and how they are broken up.

Figure 1:
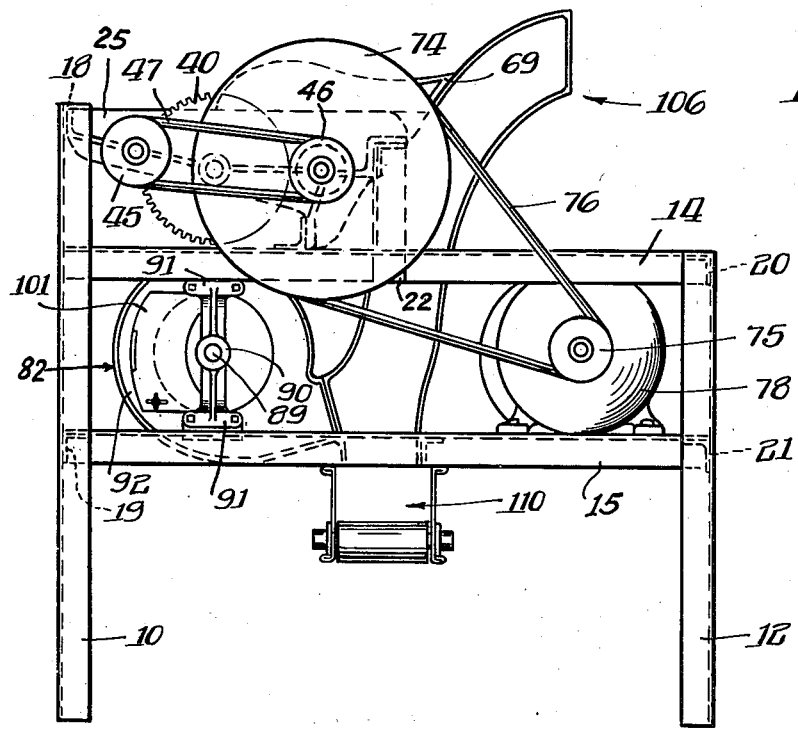
Fig. 1 is a side elevation of one form of the machine illustrating the method of carrying out the invention.

Referring now to the invention in detail, the machine for carrying out our improved method comprises preferably a main frame consisting of preferably hot rolled, L-shaped steel members welded together, thus forming a strong, rigid structure. Two pairs of oppositely disposed legs, 10, 11, 12 and 13, are held in longitudinally spaced formation by two pairs of side members 14, 15, 16 and 17 disposed one above the other, as shown preferably in Figs. 1 and 2. Legs 10-13, inclusive, are transversely spaced by two pairs of horizontally disposed end members 18, 19, 20 and 21. Positioned substantially at the middle of the upper side members 14 and 16 are two short, vertically disposed members 22 and 23 connected at their upper extremities by the transverse member 24. Two castings 25 and 26, which provide supports for cutting knives 27 and feed cams 28, hereinafter referred to, are bolted at their extremities to the frame members 18 and 20. These castings 25 and 26 are likewise bolted to hereinafter described transverse member 29 secured to frame members 14 and 16. As shown in Fig. 3, a transverse shaft 30 is journalled in bearings 31 and 32 of these castings 25 and 26 and supports feed cams 28 which feed the celery stalks to the gangs of cutter knives. These cams 28, as shown particularly in Fig. 5, are preferably provided with circular, centrally arranged apertures 34 adapted to receive the shaft 30. In addition they are provided with three radially disposed, circular apertures 35 receiving threaded rods 36, which rods serve to secure said multiple arrangement of cams into one concentric unit. One extremity of these threaded rods 36 fits into apertures 37 radially disposed upon a celery butt remover 38, as shown particularly in Fig. 6. Hub 39 of this celery butt remover 38 is preferably keyed to shaft 30 whereby rotation of shaft 30 will cause the feed cams 28 to rotate about the axis of said shaft 30. A spur gear 40 is keyed to one extremity of shaft 30 and is driven by a pinion 41 mounted upon a short shaft 42 journalled in a bearing bracket 43 bolted to casting 25. A collar 44 pinned to one extremity of shaft 30 cooperates with the spur gear 40 to prevent lateral displacement of this shaft. V-grooved pulley 45 is keyed to one extremity of shaft 42 and is driven by a V-grooved pulley 46 through a V belt 47. V-grooved pulley 46 is keyed to the right-hand extremity of a shaft 48 journalled in bearings 49 and 50 of the castings 25 and 26. A tubular knife spindle 51 having identical bushings 52, see Fig. 7, pressed in each end, facilitates the concentric mounting of said tube. The knife spindle 51 has an integral flange 53 near one end, and a threaded portion at the opposite end upon which is mounted a cooperating nut 54. A series of knives 55 are mounted on the spindle 51 and are held in spaced relation by washers 56. Flange 53 and nut 54 serve to position the knives 55 and washers 56 upon the spindle 51. Any means not shown, such for instance as a headless set screw positioned upon spindle 51 in proximity to flange 53, secures the spindle 51 to shaft 48.

Means is provided in conjunction with the knives 55 for tearing the wider sections of the celery stalk, which are nearer the butt end of the stalk, into smaller pieces after they have been cut transversely as illustrated in Figs. 10 and 11. In the present instance this means comprises a series of eccentrically mounted flanges 57 having bevelled edges. As shown in Figs. 7 and 8 and in Figs. 17, 18 and 19, these eccentric members are mounted next to the first four knives at the right end of the knife assembly, as hereinafter more fully set forth. A collar 73 cooperating with the unthreaded extremity of spindle 51 positions the shaft 48 laterally.

Means is provided for feeding the celery stalks into contact with the cutting edges of the gang knives and particularly for forcing the celery stalks forwardly and downwardly against the cutting edges of the knives and in such a manner that the feeding means preferably extends inwardly between the knives to insure the complete severance of the stalk and in such a manner that a majority of the pieces of the celery become wedged between the knives, whereby to cooperate with the means for tearing the larger pieces of severed stalk into smaller pieces, but also whereby the wedged pieces are thrown off tangentially into the air duct opening.

To this end, and for the accomplishment of other functions hereinafter set forth, in one form of the feeding means we provide a series of rectangular slats 58, see Figs. 2, 9, 10 and 11, which are positioned between each feeder cam and knife to form a general feed table. The rearward extremities of slats 58 are positioned upon the member 18, as by means of slots 59, and are secured by round-headed bolts 60 fitting into circular apertures 61. The slats 58 extend forwardly and downwardly following an irregular contour of the general shape illustrated in Fig. 9, being first straight forwardly on a moderate decline, then in an arcuate path somewhat contiguous to hub 62 of the cams 28, then reversing its curvature until the slats reach the cutting edge of knives 27, at which point the slats then bend again downwardly with their forward extremities fitted into grooves 63 of transverse member 29. These forwardly extending portions of the slats 58 extend inwardly beyond the cutting edges of the knives 27 whereby to force the celery stalks between the knives and thereby insure a complete severance of the pieces. A portion of the cut pieces thus becomes wedged between the knives. A series of finger-like ejectors 64, see Figs. 3 and 9, are provided to remove these pieces. The lower extremities of the ejectors 64 are preferably disposed adjacent the lowermost portion of spacer washers 56. The forward portions are upturned at substantially ninety degrees and are fitted into grooves 66 in the frame member 24 by means of round-headed bolts 67. A guard 68, see Fig. 9, positioned over a portion of the feed cams 33 and knives 55, is secured to two side members 69 and 70, see Figs. 1 and 2, which member in turn is fastened to the members 25 and 26 by cap screws, not shown, cooperating with threaded apertures 71 and 72 in members 25 and 26, respectively.

A grooved pulley 74 is keyed to the right extremity of shaft 48 and is driven by a V-grooved pulley 75 through a V-belt 76. V-grooved pulley 75 is keyed to drive shaft 77 of a motor 78, see Fig. 4. The motor 78 in turn is slidably mounted upon the two longitudinally disposed supports 79 and 80, welded to the transverse frame members 20 and 81.

Figure 2:
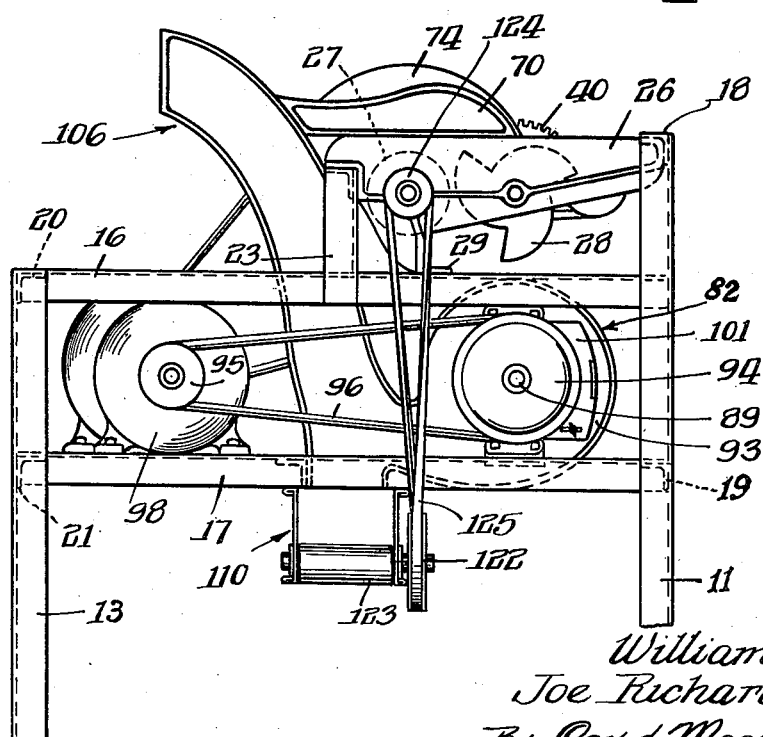
Fig. 2 is a side elevation of the side of the machine opposite from that shown in Fig. 1.

Means is provided for creating a constant output of the air draft for separating the celery leaves from the stalks independently of the speed of operation of the cutting knives. To this end a fan 82, see Figs. 1, 2 and 4, is positioned beneath the feed cams 28 and has its supporting lugs 83 and 84 bolted to plates 85 and 86 welded to frame members 15 and 17. The fan blades 87 are conveniently secured to arms 88 positioned on shaft 89 by set screws, not shown. Shaft 89 is journalled in bearings 90 carried by supports 91 which in turn are bolted to two complemental fan end castings 92 and 93. A V-grooved belt pulley 94, Fig. 4, is keyed to one extremity of the shaft 89 and is driven by a V-grooved motor pulley 95 through a V-belt 96. The motor pulley 95 is keyed to a shaft 97 of a motor 98, slidably mounted on supports 99 and 100, see Fig. 4, which supports are welded to frame members 20 and 81. The volume of air produced by the fan 82 is controlled by two shutters 101, see Fig. 12, slidably mounted in grooves 102 and 103 provided in the bearing supports 91. A thumb screw 104 cooperating with slot 105 provides means to secure the shutters 101 in varied positions.

An air duct 106, Fig. 9, is bolted to the outlet of fan 82 and also to the members 24 and 27. This duct is positioned in such a manner as to direct the air flow upwardly past the forward portion of the knives 27. An opening 107 in duct 106 permits the material cut by the knives 27 to be discharged into said duct 106. The air stream in duct 106 is maintained at a pressure that will carry the leaves and lighter material discharged by the knives upwardly to be discharged through an opening 108 while the heavier, desired pieces are permitted to gravitate and be discharged through a lower opening 109 upon a transversely disposed belt conveyor 110, Figs. 1 and 2. The conveyor 110 is bolted to the lower frame members 15 and 17 in any conventional manner. A V-grooved pulley 122, Fig. 2, mounted upon the conveyor drive shaft 123, is driven by a V-grooved pulley 124 through a V-belt 125. The pulley 124 is keyed to one extremity of the shaft 48.

Means is provided in connection with the cutting knives to tear the wider sections of the celery stalk which are cut close to the butt end into smaller pieces after they have been cut transversely as illustrated in Figs. 10 and 11 and 21-23. To this end, viewing Figs. 7, 8, 10, and 11, it will be noted that bevelled edge eccentric washers or pullers 57 are positioned preferably next to the first four knives 27 mounted upon the spindle 51 near that end at which the flange 53 is placed. There are preferably three pairs of washers 57, each pair complementally disposed. The point of greatest eccentricity of each pair of washers 57 is advanced or retarded radially from each adjoining pair. The purpose of these pullers is to tear the wide sections of celery near the butt end into smaller pieces after they have been cut transversely as illustrated in Figs. 10, 11 and 21-23. As the stalk is being cut by knives 55, the partially severed pieces become wedged between the pullers 57 and are torn from the stalk before the cut across the stalk is completed. The different radial disposition of the point of greatest eccentricity of each pair of adjoining washers causes the adjoining pieces to be torn off at different intervals. Since the cross section of the stalk tapers quickly toward the leafed portion, it is not deemed necessary to break up all the cuts, therefore the pullers 57 have been positioned only next to the first four knives cutting the butt end off the celery stalk.

Viewing Fig. 13, the butt end of the stalk 111 at the root end, to the right side of the heavy line 112, is of no pronounced commercial value, so it is not admitted into the air duct 106. In order to preclude its admission into the duct 106, a butt remover 38, Figs. 4, 10 and 11, is secured to one extremity of the feed cam shaft 30 positioned close to the end of cam 28. This butt end remover has three finger-like extensions which force the butt of the stalk downwardly, causing it to fall upon the deflector 113 and thence to the floor or to a collector.

The small or leafy portion of the stalk tends to resist being drawn into the knives more than the thick or butt end of the stalk, due to its more flexible nature. To overcome this difficulty, substantially half of the knives 57 on the left side of the spindle 51 in Fig. 3 are provided with serrated edges, as illustrated in Fig. 14.

In Figs. 15 and 16 we have shown an alternative form of feed in lieu of the horizontally disposed revolving cams. In this construction the slats 58 forming the feed table may be removed and casting 114 secured in any conventional manner to frame members 15 and 16. This casting 114 is provided with a series of slots 115 adapted to receive the cutting edges of the gang of knives 27. The forward arcuate edge of the feed member 114 extends inwardly in cam-like fashion, forcing the stalk into the knives past their cutting edges, thereby insuring positive severance of the stalk. The reciprocating pusher 115 extends the entire width of the knives 57 on the spindle 51 and the pusher is provided at each end with two downwardly extending arms 116 pivotally mounted upon the stationary shaft 117. Two eccentrics 118 keyed to a rotating shaft 119 actuate eccentric straps 118a pivotally connected to arm 116 by means of a pin 121. A feed hopper 126 placed directly above the pusher 115 provides a convenient means for feeding the machine. It will be noted that when the pusher 115 is adjacent the knives 55, the lower opening of the hopper 116 is closed.

In the operation of our machine, the motor 78 drives the gang of cutting blades 27 in an anticlockwise direction by means of pulleys 74 and 75 and V-belt 76. The feed cams rotate clockwise at a substantially slower speed than the knives 55, being driven by the knife drive shaft through the pulleys 45 and 46, V-belt 47 and the gear and pinion 40 and 41. The transversely disposed discharge conveyor is also driven by the knife drive shaft by means of pulleys 122 and 124 and V-belt 125. To insure a constant output of air from fan 82, an independent motor has been provided to drive the fan by means of pulleys 94 and 95 and V-belt 96.

Bunches of celery are placed transversely upon the feed table, comprising a multiple number of slats 58, Fig. 9, with their root ends to the operator's right. Each celery stalk is pushed forwardly by hand until it comes in contact with the feeder cams 28. These cams, revolving at slow speed, lift the stalk upwardly away from the slats 58, then forwardly and downwardly forcing each stalk against the cutting edges of the gang of knives 55 which sever the stalk in the manner illustrated in Fig. 13. The forward portion of slats 58 extending inwardly between the knives insures complete severance of the stalk. A majority of the pieces that become wedged between the knives are thrown off tangentially into the opening 107 of the air duct 106. Pieces that are wedged too tightly to be thrown out are forced outwardly by the ejector 65 and fall upon an inclined surface and are directed thereby into the air duct 106. The path of the air current created by the fan 82 is substantially in an upward direction, exerting a buoyant effect upon the leaves and light stems so as to sweep them upwardly and out of the duct through the opening 108. The desired product being heavier than the leaves falls downwardly, since the pressure of the air current is not great enough to buoy up these heavier pieces. Pressure intensity in the air duct is controlled by the fan shutters 101 and through proper adjustment of the air stream pressure a very satisfactory separation of leaves and desired pieces may be obtained.

Since the celery stalks are of wider cross section at the base of the stalk, it is desirable to break up the wide pieces into smaller parts. Three complemental pairs of eccentric bevel edged washers or pullers mounted upon the knife spindle adjacent to the first four knives at the butt cutting edge of said spindle cause the severed pieces to be wedged therebetween and break off before the stalk is completely severed. This is all illustrated in Figs. 21-23, inclusive. The breaking up of the pieces is caused by the fact that the pieces become wedged at points nearer the axis of the knives which are rotating at a different lineal velocity than points at the cutting edge of said knife. The undesirable butt of the celery is removed by the three-fingered hubbed member 38, which knocks the severed butt downward, thereby preventing said butt from entering the air duct 106.

The butt of the celery in the operation of the butt remover seems to lag behind during the cutting operation since it is not wedged between the knives as are other portions of the cut stalk, has no tendency to be thrown off the blade tangentially and so is forced downwardly by the butt remover.

As hereinbefore described, the desirable pieces of severed celery gravitate downwardly and leave the air duct 106 through opening 102, falling upon the transversely disposed belt conveyor 110. This conveyor carries the cut celery transversely where it is deposited onto another conveyor or into a suitable receptacle.

The invention is hereby claimed as follows:

1. The hereindescribed method of treating whole celery stalks which comprises cutting the stalk including the leafy portion into a plurality of portions by forming transverse lines of cuts at spaced intervals throughout the length of the stalk projecting the cut pieces of leaves and stalk laterally and in a generally horizontal path while subjecing the same to an upwardly directed intersecting current of air of sufficient intensity to deliver the leafy portions against the action of gravity to a predetermined delivery station, the weight of the severed stalk portions causing said latter portions to be delivered to an independent delivery station whereby to separate the leafy portions from the severed stalk portion.

2. In an apparatus of the character described, the combination of means forming a gang of spaced-apart cutters, means for feeding celery stalks to said cutters in a direction such that the longitudinal axis of the celery stalk extends substantially parallel to the axis of rotation of the cutters, the confronting faces of adjacent cutters having associated therewith eccentrically disposed, wedge-shaped portions adapted upon rotation of the cutters to grasp opposed severed ends of the severed section and pull said severed section away from the main body of the celery while still united thereto to break off said severed section into a plurality of smaller portions.

3. In a device of the class described, a combination of means forming a casing, a gang of substantially rotary cutters disposed therein, means for feeding celery stalks to said gang of rotary cutters, whereby to cause the cutters to cut the stalks transversely into a plurality of stalk sections, means associated with said cutters for breaking said severed celery sections transversely, said means and said cutters serving to project said stalk pieces away from said cutting means in a generally horizontal direction, means in said casing for creating an upwardly directed blast of air across said projected sections, the blast being of sufficient intensity to blow celery leaves against the force of gravity to deliver said leaves at a point separate from the station to which the severed stalk sections are delivered by gravity.

4. In a device of the class described the combination of means forming a gang of substantially parallel rotary cutters, there being sufficient cutters to cut the celery stalk beginning at a point slightly spaced from the butt end and extending longitudinally thereof and including the leafy portion of the stalk, means for feeding a succession of celery stalks to said gang of cutters whereby to cut the stalk and leafy portion into a plurality of transversely extending lengths, means disposed at the butt end portion of the stalk for discharging the unsevered butt end to a discharge station, separate means for discharging the severed stalk sections to a separate station and for discharging the cut leafy sections independently of the severed stalk sections.

5. In a device of the character described, the combination of a casing, a gang of rotary cutters in said casing, a feed chute disposed slightly above and to one side of the upper periphery of said gang of cutters, a stationary platform disposed beneath said chute and having a plurality of portions extending inwardly between opposed cutters and a supporting ledge portion extending substantially radially of the gang of cutters and lying horizontally, reciprocating feed means including a pusher surface reciprocating between the bottom mouth of the chute and said horizontal ledge for progressively feeding a stalk into and through the cutters of the gang, said reciprocating feeder having a substantially horizontal portion adapted to close the bottom mouth of the chute when feeding a stalk to said rotary cutters, and said inwardly extending portions of the stationary platform having cam surfaces arranged substantially eccentrically with respect to the axis of the cutters and progressing inwardly toward the said axis from a point adjacent said ledge whereby to engage material fed to the cutters and forced positively between the cutting edges for effecting complete severance thereof.

6. In a device of the class described, the combination of a support, a pair of parallel shafts mounted in spaced relation on said support, a gang of rotary cutters disposed in spaced parallel relationship on one of said shafts, a gang of rotary feed cams disposed in spaced relation upon said parallel shaft, each feed cam cooperating with and between a pair of adjacent cutters, slat-like feeding means cooperating with and disposed between adjacent feed cams and having the discharge ends of said slat-like means disposed between a pair of the cutters, means for synchronously driving said cutters and said feed cams whereby progressively to feed a succession of celery stalks into contact with and between said gang of cutters, said shaft upon which said feed cams are mounted having at the end of said feed cams a celery butt discharge member including a plurality of angularly disposed feed arms adapted upon operation of said machine to discharge the severed butt of the celery to a point independent of the discharge station of the severed stalk sections of the celery.

7. In a device of the character described, the combination of means forming a plurality of spaced-apart, substantially parallel rotary cutters forming a plurality of pairs, certain of said pairs having their confronting faces provided with substantially parallel, relatively flat disks of suitable friction-gripping material, said disk faces having eccentrically formed, wedge-like projections, the eccentricity of opposed pairs of said wedge-like projections being dissimilar, whereby, upon rotation of said cutters and said disks, said cutters will cut celery stalks transversely and said eccentric disks will engage and press against the severed ends of the severed sections and will pull said portions away from the main body of the celery in a manner to break off a section of the severed portion.

8. In a device of the character described, the combination of means comprising a plurality of spaced-apart, substantially parallel rotary cutters forming a plurality of pairs of cutters, said cutters being adapted to transversely sever into smaller pieces a length of substance presented transversely to the cutting edges thereof, at least one confronting face of said pairs being provided with a generally flat member secured flatwise to said confronting face, said flat member being formed of suitable friction-gripping material and having at least one inclined edge offset inwardly from the cutting edge of the adjacent cutter, said edge providing a wedge-like projection transversely to said face and being arranged eccentrically with respect to the periphery of said rotary cutters, whereby, upon rotation of said cutters and said flat member, said cutters will cut the substance transversely and said flat member will engage and grasp the severed ends of severed sections at predetermined times during the rotation of the cutters after pulling said portions away from the main body of the substance in a manner to break off a section of the severed portion.

9. In a device for cutting celery stalks and comprising a gang of parallel rotary cutters, feeding means for supplying a succession of celery stalks transversely to said cutters while oriented longitudinally of the axis of said cutters, said gang of rotary cutter blades comprising a group of blades adjacent one end of the gang adapted to cut the stalk portions adjacent the butt ends and comprising circular cutting edges and a group of said blades adjacent the opposite portion of said gang being adapted to sever the leafy portions only and having serrated peripheral edges whereby all portions of the stalk are cut with substantially equal facility.

10. In a device of the class described, the combination of a frame, a gang of rotary cutters on said frame, a feed table disposed in feeding relationship on the feed side of said cutters for supporting the substance fed to said gang of blades, cam means associated with said table for feeding material in predetermined relationship along said table and between the cutting blades, said cam means having its axis of rotation generally parallel to the axis of rotation of said rotary cutters, said cam means including outwardly extending portions and intermediate cam surfaces between the outwardly extending portions, said cam surfaces extending from the outer ends of said outwardly extending portions in a curved direction eccentrically inwardly towards the axis of said cam means, and means to rotate said cam to bring said cam surfaces progressively toward the cutting edges of the blades whereby upon rotation of said cam means, successively and individually to feed a single stalk into contact with a gang of cutters thereby to cause the cutters progressively to cut transversely through the entire stalk at spaced intervals longitudinally of its length.

11. In an apparatus of the class described, the combination of means forming a gang of spaced-apart rotatable cutters, means for feeding celery stalks or the like to said cutters in a direction such that the longitudinal axis of the stalk extends substantially parallel to the axis of rotation of the cutters, the confronting faces of adjacent cutters having wedging gripping surfaces rotatable therewith disposed so that they incline outwardly of the plane of each cutter in a line adjacent the cutting edge extending about the axis of rotation of the gang of cutter blades as a center, and adapted upon rotation of the cutters to grasp opposed, severed ends of the severed section and pull said severed sections away from the main body of the stalk or the like while still united thereto to break off said severed sections into a plurality of smaller portions, said gripping surface merging with the side surface of the cutting blade adjacent the cutting edge.

WILLIAM E. URSCHEL.
JOE RICHARD URSCHEL.